United States Patent
Sawada et al.

(10) Patent No.: US 12,556,019 B2
(45) Date of Patent: *Feb. 17, 2026

(54) POWER SUPPLY CONTROL DEVICE HAVING A SWITCH THAT VARIES ACCORDING TO AN AMBIENT TEMPERATURE (71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Ryohei Sawada, Yokkaichi (JP); Kota Oda, Yokkaich (JP); Koki Sakakibara, Yokkaichi (JP); Masaya Ina, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 698 days.

This patent is subject to a terminal disclaimer.

(21) Appl. No.: 17/995,645

(22) PCT Filed: Mar. 15, 2021

(86) PCT No.: PCT/JP2021/010271
§ 371 (c)(1),
(2) Date: Oct. 6, 2022

(87) PCT Pub. No.: WO2021/205816
PCT Pub. Date: Oct. 14, 2021

(65) Prior Publication Data
US 2023/0123793 A1   Apr. 20, 2023

(30) Foreign Application Priority Data
Apr. 10, 2020  (JP) ................. 2020-071143

(51) Int. Cl.
H02J 7/00   (2006.01)
H02H 5/04   (2006.01)

(52) U.S. Cl.
CPC ......... *H02J 7/00712* (2020.01); *H02H 5/042* (2013.01); *H02J 7/00304* (2020.01); *H02J 7/0063* (2013.01)

(58) Field of Classification Search
CPC .................................................. H02J 7/00712
(Continued)

(56) References Cited

U.S. PATENT DOCUMENTS 11,031,771 B2 *  6/2021 Oda ................. B60R 16/033
12,289,049 B2 *  4/2025 Murata ............... H03K 17/08
(Continued)

FOREIGN PATENT DOCUMENTS

JP   2011-125101 A   6/2011

OTHER PUBLICATIONS

International Search Report, Application No. PCT/JP2021/010271, mailed May 25, 2021. ISA/Japan Patent Office.

*Primary Examiner* — Yalkew Fantu
(74) *Attorney, Agent, or Firm* — Honigman LLP (57) ABSTRACT A power supply control device controls power supply from a DC power source to a load, by turning on or off a MOSFET. A current regulation circuit regulates a current flowing through a device resistor to a current proportional to a voltage between the drain and the source of the MOSFET. A drive circuit turns off the MOSFET when a voltage across a resistor circuit exceeds a predetermined voltage. The on-resistance of the MOSFET varies according to an ambient temperature of the MOSFET. The resistance of the resistor circuit varies in a direction different from a direction in which the on-resistance of the MOSFET varies, according to the ambient temperature of the MOSFET.

4 Claims, 6 Drawing Sheets (58) Field of Classification Search
USPC .......................................................... 320/135
See application file for complete search history.

(56) References Cited

U.S. PATENT DOCUMENTS

| | | |
|---|---|---|
| 2006/0066286 A1 | 3/2006 | Yokota et al. |
| 2019/0199305 A1* | 6/2019 | Sugie ................. H02K 41/0354 |
| 2019/0260338 A1 | 8/2019 | Oda et al. |
| 2019/0267795 A1* | 8/2019 | Oda ......................... H02H 7/12 |

* cited by examiner

$$Ith = \frac{Rt \cdot Vr}{Rs \cdot Ra}$$

Ith : Current threshold
Rt : Resistance of device resistor
Rs : Resistance of resistor circuit
Ra : On-resistance of MOSFET
Vr : Reference voltage (Condition for maintaining current threshold ITH at target current IG)

$$Rs \cdot Ra = \underbrace{\frac{Rt \cdot Vr}{Ig}}_{\text{Constant ITH}}$$

Effect of series resistor

Rr: Resistance of thermistor
Rc: Resistance of series resistor
Rf: Resistance of series circuit

FIG. 7

Effect of parallel resistor $Rf1 \longrightarrow \dfrac{Rf1 \cdot Rp}{Rf1 + Rp}$   Decrease width: Large $Rf2 \longrightarrow \dfrac{Rf2 \cdot Rp}{Rf2 + Rp}$   Decrease width: Small Rr: Resistance of thermistor
Rc: Resistance of series resistor
Rf: Resistance of series circuit
Rp: Resistance of parallel resistor
Rs: Resistance of resistor circuit

FIG. 8

POWER SUPPLY CONTROL DEVICE HAVING A SWITCH THAT VARIES ACCORDING TO AN AMBIENT TEMPERATURE

CROSS-REFERENCE TO RELATED APPLICATIONS

This application is the U.S. national stage of PCT/JP2021/010271 filed on Mar. 15, 2021, which claims priority of Japanese Patent Application No. JP 2020-071143 filed on Apr. 10, 2020, the contents of which are incorporated herein.

TECHNICAL FIELD

The present disclosure relates to a power supply control device.

BACKGROUND

JP 2019-146385A discloses a power supply control device for a vehicle that controls power supply from a direct current (DC) power source to a load. In this power supply control device, a current flows from the DC power source to the load through a switch. The switch is turned on or off to control power supply from the DC power source to the load. A first resistor is disposed in a first current path through which a current flowing through the switch flows. In the first current path, the first resistor is disposed between the switch and the load.

One end of the second resistor is disposed at one end on the upstream side of the first resistor. The current flows from the DC power supply to the switch and the second resistor in this order. A detection resistor for detecting a voltage is disposed in a second current path through which a current flowing through the second resistor flows. The current flowing through the second current path is regulated to a current proportional to the current flowing through the first resistor. Accordingly, as the current flowing through the first current path, that is to say, the current flowing through the load becomes larger, the current flowing through the second current path also becomes larger. Also, as the current flowing through the second current path becomes larger, the voltage across the detection resistor becomes higher. When the voltage across the detection resistor is large, it is determined that the current flowing through the load is large, and the switch is turned off. This prevents an overcurrent from flowing through the load.

In the power supply control device disclosed in JP 2019-146385A, the first resistor needs to be disposed in the first current path to detect a current flowing through the first current path. The current flowing through the first current path flows through the load, and is large. For this reason, as the first resistor disposed in the first current path, a large and expensive element that allows a large current to flow is needed. As a result, the power supply control device disclosed in JP 2019-146385A has a problem in that its configuration is large and its manufacturing cost is high.

Therefore, an object of the present invention is to provide a compact and inexpensive power supply control device.

SUMMARY

A power supply control device according to an aspect of the present disclosure is a power supply control device for controlling power supply by turning on or off a semiconductor switch through which a current flows, the power supply control device including: a resistor having one end connected to one end on an upstream side of the semiconductor switch; a current regulation circuit configured to regulate a current flowing through the resistor to a current proportional to a voltage across the semiconductor switch; a resistor circuit disposed in a current path through which a current flowing through the resistor flows; and a switching circuit configured to turn off the semiconductor switch when a voltage across the resistor circuit exceeds a predetermined voltage, wherein an on-resistance of the semiconductor switch varies according to an ambient temperature of the semiconductor switch, and a resistance of the resistor circuit varies, according to the ambient temperature, in a direction different from a direction in which the on-resistance varies.

Effects of the Present Disclosure

According to the present disclosure, a compact and inexpensive power supply control device can be achieved.

DETAILED DESCRIPTION OF PREFERRED EMBODIMENTS

First, embodiments of the present disclosure will be listed and described. At least some of the embodiments described below may also be combined as appropriate.

First Aspect

A power supply control device according to a first aspect of the present disclosure is a power supply control device for controlling power supply by turning on or off a semiconductor switch through which a current flows, the power supply control device including: a resistor having one end connected to one end on an upstream side of the semiconductor switch; a current regulation circuit configured to regulate a current flowing through the resistor to a current proportional to a voltage across the semiconductor switch; a resistor circuit disposed in a current path through which a current flowing through the resistor flows; and a switching circuit configured to turn off the semiconductor switch when a voltage across the resistor circuit exceeds a predetermined voltage, wherein an on-resistance of the semiconductor switch varies according to an ambient temperature of the semiconductor switch, and a resistance of the resistor circuit varies, according to the ambient temperature, in a direction different from a direction in which the on-resistance varies.

In the first aspect, a current flows through the load through the semiconductor switch. The semiconductor switch not only functions as a switch for controlling power supply to the load, but also functions as a resistor for detecting a current flowing through the load. Accordingly, because the number of elements disposed in the current path through which the current flowing through the load flows is small, the configuration is compact and the manufacturing cost is low.

The on-resistance of the semiconductor switch is a resistance across the semiconductor switch when the semiconductor switch is on. The voltage across the semiconductor switch is expressed by (on-resistance) (current flowing through the load). Here, "·" indicates multiplication. The current flowing through the resistor is proportional to the voltage across the semiconductor switch. Accordingly, the voltage across the resistor circuit is proportional to (on-resistance) (current flowing through the load) (resistance of the resistor circuit). Also, the resistance of the resistance circuit varies, according to the ambient temperature of the semiconductor switch, in a direction different from a direction in which the on-resistance varies. When the on-resistance increases, for example, the resistance of the resistor circuit decreases.

Therefore, even when the ambient temperature of the semiconductor switch varies, the voltage across the resistor circuit hardly varies according to the ambient temperature of the semiconductor switch, and is proportional to the current flowing through the load through the semiconductor switch. As a result, when the current flowing through the load through the semiconductor switch exceeds a certain value, the voltage across the resistor exceeds a predetermined voltage, and the semiconductor switch is turned off.

Second Aspect

In the power supply control device according to a second aspect of the present disclosure, the resistor circuit may include: a thermistor whose resistance varies, according to the ambient temperature, in a direction different from a direction in which the on-resistance varies; and a series resistor connected in series to the thermistor.

In the second aspect, the thermistor is disposed in the resistor circuit, and the resistance of the thermistor varies, according to the ambient temperature of the semiconductor switch, in a direction different from a direction in which the on-resistance of the semiconductor switch varies. For this reason, the resistance of the resistor circuit varies, according to the ambient temperature of the semiconductor switch, in a direction different from a direction in which the on-resistance varies of the semiconductor switch.

When (on-resistance) (resistance of the resistor circuit) is constant regardless of the ambient temperature of the semiconductor switch, the voltage across the resistor circuit is constant regardless of the ambient temperature of the semiconductor switch. In this case, the semiconductor switch can be turned off at an appropriate timing. Accordingly, even when (on-resistance) (resistance of the thermistor) varies according to the ambient temperature, it is possible to achieve a configuration in which (on-resistance) (resistance of the resistor circuit) is constant regardless of the ambient temperature of the semiconductor switch, by connecting the series resistor in series to the thermistor.

Third Aspect

In the power supply control device according to a third aspect of the present disclosure, the resistor circuit may include a parallel resistor connected in parallel to a series circuit constituted by the thermistor and the series resistor.

In the third aspect, even when (on-resistance) (resistance of the thermistor) varies according to the ambient temperature, it is possible to reliably achieve a configuration in which (on-resistance) (resistance of the resistor circuit) is constant regardless of the ambient temperature of the semiconductor switch, by connecting the series resistor and the parallel resistor.

Fourth Aspect

In the power supply control device according to a fourth aspect of the present disclosure, the current regulation circuit may include: a variable resistor disposed on a downstream side of the resistor in the current path; and a resistance regulation unit configured to regulate the resistance of the variable resistor so that a voltage at one end on a downstream side of the semiconductor switch is equal to a voltage at one end on the downstream side of the resistor.

In the fourth aspect, the resistance of the variable resistor is regulated so that a voltage at one end on the downstream side of the semiconductor switch is equal to a voltage at one end on the downstream side of the resistor. With this configuration, the current flowing through the resistor is regulated to a value obtained by dividing the voltage across the semiconductor switch by the resistance of the resistor circuit.

Specific examples of a power source system according to an embodiment of the present disclosure will be described below with reference to the drawings. Note, that the present invention is not limited to the following examples, but rather is defined by the claims, and all changes that come within the meaning and range of equivalency of the claims are intended to be embraced therein.

First Embodiment

Configuration of Power Source System

Figure 1:
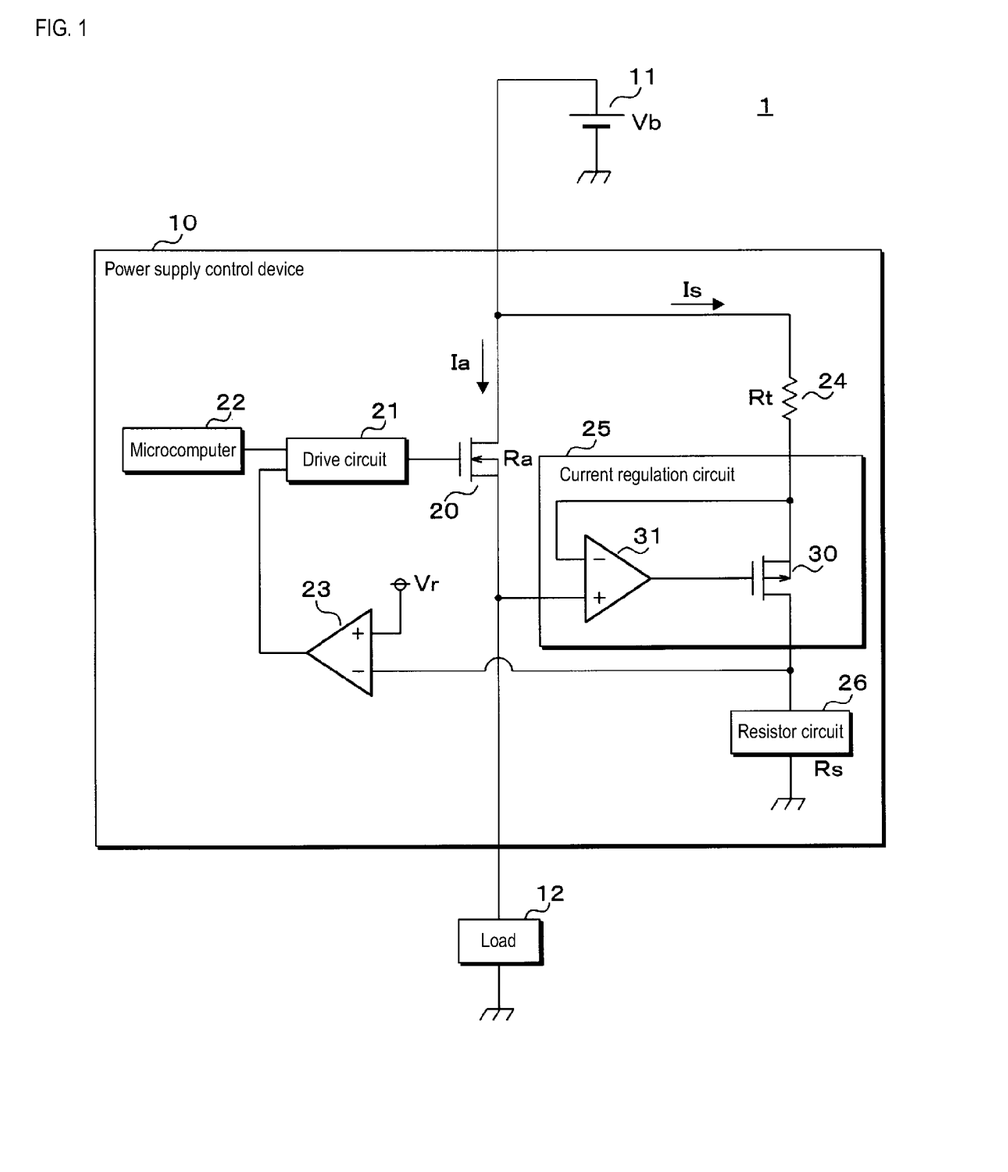
FIG. 1 is a block diagram showing a main configuration of a power source system according to a first embodiment.

FIG. 1 is a block diagram showing a main configuration of a power source system 1 according to a first embodiment. The power source system 1 is installed in a vehicle, and includes a power supply control device 10, a DC power source 11, and a load 12. The DC power source 11 is a battery, for example. The load 12 is an electric device that is installed in the vehicle.

The power supply control device 10 includes an N-channel MOSFET 20 that functions as a semiconductor switch. The drain and the source of the MOSFET 20 are connected to the positive electrode of the DC power source 11 and one end of the load 12, respectively. The negative electrode of the DC power source 11 and the other end of the load 12 are grounded.

When the MOSFET 20 is on, the resistance between the drain and the source of the MOSFET 20 is small, and a current flows through the drain and the source. The on-resistance of the MOSFET 20 is the resistance between the drain and the source of the MOSFET 20 at the time when the MOSFET 20 is on. When the MOSFET 20 is on, a current flows from the positive electrode of the DC power source 11 through the MOSFET 20, the load 12, and to the negative electrode of the DC power source 11 in this order, and power is supplied to the load 12. When power is supplied to the load 12, the load 12 can operate.

In contrast, when the MOSFET 20 is off, the resistance between the drain and the source of the MOSFET 20 is sufficiently large, and no current flows through the drain and the source. When the MOSFET 20 is off, the DC power source 11 supplies no power to the load 12, and the load 12 stops operating.

The power supply control device 10 controls power supply from the DC power source 11 to the load 12 by turning on or off the MOSFET 20.

Configuration of Power Supply Control Device 10

The power supply control device 10 includes, in addition to the MOSFET 20, a drive circuit 21, a microcomputer 22, a comparator 23, a device resistor 24, a current regulation circuit 25, and a resistor circuit 26. The current regulation circuit 25 includes a regulation FET 30 for regulating a current, and a differential amplifier 31. The comparator 23 and the differential amplifier 31 each include a positive terminal, a negative terminal, and an output terminal. The regulation FET 30 is a P-channel FET (field effect transistor).

The drive circuit 21 is connected to the gate of the MOSFET 20. In addition, the microcomputer 22, and the output terminal of the comparator 23 are connected to the drive circuit 21. The drain of the MOSFET 20 is further connected to one end of the device resistor 24. The other end of the device resistor 24 is connected to the source of the regulation FET 30 included in the current regulation circuit 25. The drain of the regulation FET 30 is connected to one end of the resistor circuit 26. The other end of the resistor circuit 26 is grounded. In the current regulation circuit 25, the source and the gate of the regulation FET 30 are connected to the negative terminal and the output terminal of the differential amplifier 31, respectively. The positive terminal of the differential amplifier 31 is connected to the source of the MOSFET 20. The one end of the resistor circuit 26 is further connected to the negative terminal of the comparator 23.

The drive circuit 21 outputs a voltage. The voltage outputted from the drive circuit 21 is applied to the gate of the MOSFET 20. The reference potential of the voltage outputted from the drive circuit 21 is the ground potential. When the voltage outputted from the drive circuit 21 is a predetermined on-voltage or higher, the MOSFET 20 is on. When the voltage outputted from the drive circuit 21 is a predetermined off-voltage or lower, the MOSFET 20 is off. The on-voltage exceeds the off-voltage. Here, the off-voltage is a positive voltage.

The drive circuit 21 turns on the MOSFET 20 by regulating the voltage outputted from the drive circuit 21 to a voltage that is the on-voltage or higher. The drive circuit 21 turns off the MOSFET 20 by regulating the voltage outputted from the drive circuit 21 to a voltage that is the off-voltage or lower. As described above, when the MOSFET 20 is on, a current flows through the MOSFET 20, and power is supplied from the DC power source 11 to the load 12. At this time, the current flows from the drain to the source of the MOSFET 20 in this order. Therefore, in the path through which the current flowing through the MOSFET 20 flows, the drain and the source of the MOSFET 20 are one end on the upstream side and one end on the downstream side, respectively. As described above, when the MOSFET 20 is off, the power supply to the load 12 is stopped. Hereinafter, a current flowing through the MOSFET 20 will be referred to as "switch current".

Also, a current flows from the positive electrode of the DC power source 11 through the device resistor 24, the regulation FET 30 of the current regulation circuit 25, and the resistor circuit 26 in this order. Accordingly, one end on the current regulation circuit 25 side of the resistor circuit 26 is one end on the upstream side. In contrast, one end, which is grounded, of the resistor circuit 26 is one end on the downstream side. Hereinafter, a current flowing through the device resistor 24 will be referred to as "resistor current". In the current path through which the resistor current flows, the regulation FET 30 of the current regulation circuit 25 is disposed on the downstream side of the device resistor 24, and the resistor circuit 26 is disposed on the downstream side of the regulation FET 30 of the current regulation circuit 25.

The microcomputer 22 and the comparator 23 each output a high-level voltage and a low-level voltage to the drive circuit 21. The reference potential of the high-level voltage and the low-level voltage is the ground potential. The high-level voltage is higher than the low-level voltage. The drive circuit 21 turns on or off the MOSFET 20 based on the voltage outputted from the microcomputer 22 and the comparator 23.

The microcomputer 22 switches its output voltage to a high-level voltage when operating the load 12, and switches its output voltage to a low-level voltage when stopping the operation of the load 12. A predetermined voltage is applied to the negative terminal of the comparator 23. The predetermined voltage is a positive voltage and is generated by, for example, a regulator stepping down a voltage outputted from the DC power source 11. The reference potential of the predetermined voltage is the ground potential. The voltage, with respect to the ground potential, at one end on the upstream side of the resistor circuit 26 is applied to the negative terminal of the comparator 23. The voltage, with respect to the ground potential, at one end of the upstream side of the resistor circuit 26 is the voltage across the resistor circuit 26. Hereinafter, the voltage across the resistor circuit 26 is referred to as "circuit voltage". When the circuit voltage reaches the predetermined voltage or lower, the comparator 23 switches its output voltage from a low-level voltage to a high-level voltage. In contrast, when the circuit voltage exceeds the predetermined voltage, the comparator 23 switches its output voltage from a high-level voltage to a low-level voltage.

In the current regulation circuit 25, the differential amplifier 31 outputs a voltage whose reference potential is the ground potential. The voltage outputted from the differential amplifier 31 is applied to the gate of the regulation FET 30. The higher the voltage outputted from the differential amplifier 31 is, the larger the resistance between the drain and the source of the regulation FET 30 is. In contrast, the lower the voltage outputted from the differential amplifier 31 is, the smaller the resistance between the drain and the source of the regulation FET 30 is. The differential amplifier 31 regulates the resistance between the drain and the source of the regulation FET 30 by regulating its output voltage. The regulation FET 30 and the differential amplifier 31 function as a variable resistor and a resistance regulation unit, respectively.

Hereinafter, the voltage at the source of the MOSFET 20 will be referred to as "switch voltage". Also, the voltage at the output terminal of the device resistor 24 will be referred to as "resistor voltage". The reference potential of the switch voltage and the resistor voltage is the ground potential. The differential amplifier 31 regulates its output voltage to a higher voltage as the difference voltage calculated by subtracting the resistor voltage from the switch voltage is higher.

The differential amplifier 31 increases its output voltage when the switch voltage rises to a voltage higher than the resistor voltage. At this time, the larger the difference voltage between the switch voltage and the resistor voltage is, the larger the width of increase in the output voltage of the differential amplifier 31 is. The increase in the voltage outputted from the differential amplifier 31 increases the resistance between the drain and the source of the regulation FET 30, and decreases the current flowing through the device resistor 24. As a result, the width of the voltage drop generated in the device resistor 24 is reduced and the resistor voltage is increased.

The differential amplifier 31 decreases its output voltage when the switch voltage decreases to a voltage lower than the resistor voltage. At this time, the larger the absolute value of the difference voltage between the switch voltage and the resistor voltage is, the larger the width of the decrease in the output voltage of the differential amplifier 31 is. The decrease in the voltage outputted from the differential amplifier 31 decreases the resistance between the drain and the source of the regulation FET 30, and increases the current flowing through the device resistor 24. As a result, the width of the voltage drop generated in the device resistor 24 is increased and the resistor voltage is decreased.

As described above, the differential amplifier 31 regulates the resistance between the drain and the source of the regulation FET 30 so that the switch voltage is equal to the resistor voltage. Here, the voltage across the DC power source 11 is denoted by Vb. The on-resistance of the MOSFET 20 is denoted by Ra. The switch current flowing through the MOSFET 20 is denoted by Ia. The resistance of the device resistor 24 is denoted by Rt. The resistor current flowing through the device resistor 24 is denoted by Is. When the MOSFET 20 is on, the switch voltage is represented by (Vb−Ra·Ia). Here, " " indicates multiplication. Also, the resistor voltage is represented by (Vb−Rt·Is).

Because the switch voltage is equal to the resistor voltage, the following equation holds.

$$Vb - Ra \cdot Ia = Vb - Rt \cdot Is$$

By expanding this equation, the following equation is obtained.

$$Is = Ra \cdot Ia / Rt$$

That is to say, the differential amplifier 31 regulates the resistor current Is to (Ra·Ia/Rt). (Ra·Ia) is the voltage across the MOSFET 20 at the time when the MOSFET 20 is on. Accordingly, (Ra·Ia/Rt) is proportional to the voltage across the MOSFET 20.

The resistance and the circuit voltage of the resistor circuit 26 are denoted by Rs and Vd, respectively. Because the circuit voltage Vd is expressed by (Rs·Is) and the resistor current Is is expressed by (Ra·Ia/Rt), the following equation holds:

$$Vd = Rs \cdot Ra \cdot Ia / Rt$$

The predetermined voltage applied to the positive terminal of the comparator 23 is denoted by Vr. The voltage outputted from the comparator 23 is a high-level voltage when Vr≥Vd is satisfied. When Vr≥Vd is satisfied, the following equation is obtained by substituting (Rs·Ra·Ia/Rt) for Vd.

$$Vr \geq Rs \cdot Ra \cdot Ia / Rt$$

By expanding this equation, the following equation is obtained:

$$Ia < (Rt \cdot Vr)/(Rs \cdot Ra)$$

The voltage outputted from the comparator 23 is a low-level voltage when Vr<Vd is satisfied. When Vr<Vd is satisfied, (Rs·Ra·Ia/Rt) is substituted for Vd, and the equation is developed. As a result, the following equation is obtained.

$$Ia > (Rt \cdot Vr)/(Rs \cdot Ra)$$

A current threshold Ith is defined by the following equation.

$$Ith = (Rt \cdot Vr)/(Rs \cdot Ra)$$

The comparator 23 switches its output voltage to a high-level voltage when the switch current Ia is the current threshold Ith or lower, and switches its output voltage to a low-level voltage when the switch current Ia exceeds the current threshold Ith.

When the MOSFET 20 is off, no current flows through the load 12 and the switch voltage is zero volts. In this case, the differential amplifier 31 reduces the voltage at the gate of the regulation FET 30 so that the resistor voltage is equal to the switch voltage. Accordingly, when the MOSFET 20 is off, the resistance between the drain and the source of the regulation FET 30 is sufficiently small. As a result, when the MOSFET 20 is off, the voltage across the DC power source 11 is divided by the device resistor 24 and the resistor circuit 26. The divided voltage obtained by voltage division by the device resistor 24 and the resistor circuit 26 is applied to the negative terminal of the comparator 23.

The divided voltage exceeds the predetermined voltage Vr. Therefore, when the MOSFET 20 is off, the comparator 23 outputs a low-level voltage.

Operation of Power Supply Control Device 10

Figure 2:
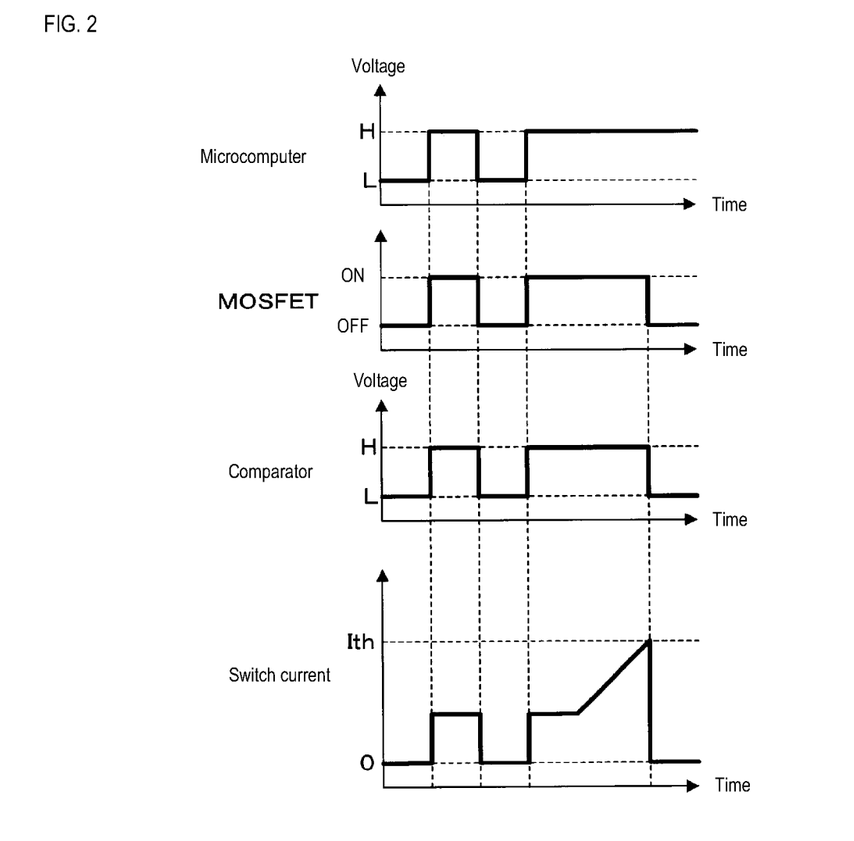
FIG. 2 is a timing chart illustrating the operation of the power supply control device.

FIG. 2 is a timing chart illustrating the operation of the power supply control device 10. FIG. 2 shows changes in the voltage outputted from the microcomputer 22, the state of the MOSFET 20, the voltage outputted from the comparator 23, and the switch current. In FIG. 2, the horizontal axis of each graph represents time. Also, a high-level voltage and a low-level voltage are denoted by H and L, respectively.

When the microcomputer 22 outputs a low-level voltage, the drive circuit 21 keeps the MOSFET 20 off. Accordingly, the switch current is zero amperes, and the voltage outputted from the comparator 23 is a low-level voltage.

When the microcomputer 22 switches its output voltage from a low-level voltage to a high-level voltage, the drive circuit 21 turns on the MOSFET 20, regardless of the voltage outputted from the comparator 23. As a result, a switch current flows through the MOSFET 20, and the switch current increases from zero amperes. When the power source system 1 is normal and the MOSFET 20 is on, the switch current is the current threshold Ith or lower.

When the MOSFET 20 is on, a circuit voltage proportional to the switch current is applied to the negative terminal of the comparator 23. In this case, because the switch current is the current threshold Ith or lower, the comparator 23 switches its output voltage from a low-level voltage to a high-level voltage.

When the microcomputer 22 switches its output voltage from a high-level voltage to a low-level voltage, the drive circuit 21 turns off the MOSFET 20, regardless of the voltage outputted from the comparator 23. As a result, the switch current drops to zero amperes. At this time, because the MOSFET 20 is off, the comparator 23 switches its output voltage from a high-level voltage to a low-level voltage.

As described above, when the microcomputer 22 switches its output voltage from a low-level voltage to a high-level voltage, the drive circuit 21 turns on the MOSFET 20. As a result, the switch current flows through the MOSFET 20. When the MOSFET 20 is on and the switch current is the current threshold Ith or lower, the comparator 23 outputs a high-level voltage. Here, it is assumed that a failure occurs in the power source system 1 and the switch current increases. The failure is, for example, a short circuit across the load 12.

When the switch current exceeds the current threshold Ith, the comparator 23 switches its output voltage from a high-level voltage to a low-level voltage. When the voltage outputted from the comparator 23 is switched from a high-level voltage to a low-level voltage in a state where the voltage outputted from the microcomputer 22 is a high-level voltage, the drive circuit 21 turns off the MOSFET 20. As a result, the switch current decreases to zero amperes. Because the MOSFET 20 is turned off, the comparator 23 continues to output a low-level voltage. The drive circuit 21 keeps the MOSFET 20 off until the voltage outputted from the microcomputer 22 is switched from a low-level voltage to a high-level voltage. The drive circuit 21 functions as a switching circuit.

As described above, because the drive circuit 21 turns off the MOSFET 20 when the switch current exceeds the current threshold Ith, an overcurrent is prevented from flowing through the MOSFET 20. When an overcurrent flows through the MOSFET 20, the temperature of the MOSFET 20 may rise to an abnormal temperature. At this time, the MOSFET 20 may be damaged.

The MOSFET 20 not only functions as a switch for controlling power supply from the DC power source 11 to the load 12, but also functions as a resistor for detecting a current flowing through the load 12. Accordingly, it is not necessary to dispose a shunt resistor for current detection in the current path through which a switch current flows, and the number of elements disposed in the current path through which the switch current flows is small. As a result, the configuration of the power supply control device 10 is compact, and the manufacturing cost of the power supply control device 10 is low.

The switch current flowing when the MOSFET 20 is on is the main current flowing through the load 12. Accordingly, even when the switch current is lower than the current threshold Ith, the switch current is large. For this reason, the element disposed in the current path through which the switch current flows is a large element in which a large current is allowed to flow, and the element disposed in the current path through which the switch current flows is expensive. Therefore, as the number of elements disposed in the current path through which the switch current flows is small, the configuration of the device is smaller and the manufacturing cost of the device is lower.

Temperature Dependence of On-Resistance of MOSFET 20

Figure 3:
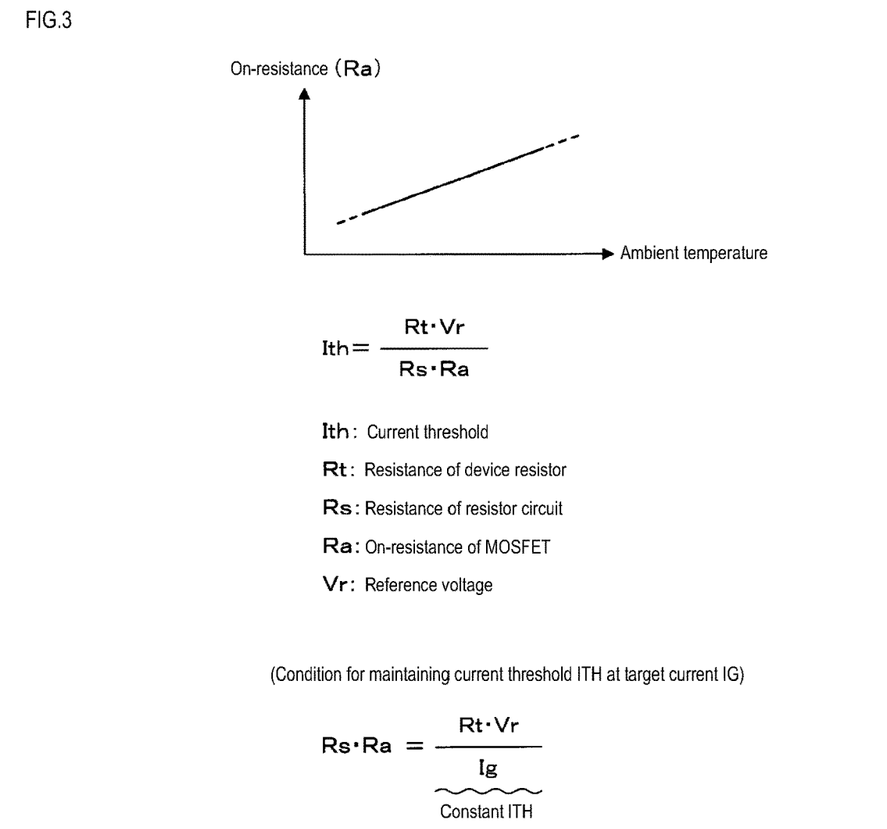
FIG. 3 is a graph showing the relationship between the on-resistance of the MOSFET and its ambient temperature.

FIG. 3 is a graph showing the relationship between the on-resistance Ra of the MOSFET 20 and its ambient temperature. When a switch current flows through the MOSFET 20, the MOSFET 20 generates heat and the temperature of the MOSFET 20 rises. The ambient temperature of the MOSFET 20 varies similarly to the temperature of the MOSFET 20. The on-resistance Ra of the MOSFET 20 varies according to the temperature of the MOSFET 20, that is to say, according to the ambient temperature of the MOSFET 20. As shown in FIG. 3, the on-resistance Ra of the MOSFET 20 becomes higher, as the ambient temperature of the MOSFET 20 becomes higher.

As described above, the current threshold Ith is represented by $(Rt \cdot Vr)/(Rs \cdot Ra)$. Here, Rt, Vr, and Rs are the resistance of the device resistor 24, the predetermined voltage, and the resistance of the resistor circuit 26, respectively. The current threshold Ith is preferably constant regardless of the temperature of the MOSFET 20, that is to say, the ambient temperature of the MOSFET 20. Unfortunately, the on-resistance Ra of the MOSFET 20 varies according to the ambient temperature of the MOSFET 20.

The resistance Rs of the resistor circuit 26 varies in a direction different from a direction in which the on-resistance of the MOSFET 20 varies, according to the ambient temperature of the MOSFET 20. For this reason, the current threshold Ith hardly varies according to the ambient temperature of the MOSFET 20.

Here, it is assumed that, for example, the on-resistance Ra of the MOSFET 20 has increased to twice the on-resistance Ra before the increase in the ambient temperature of the MOSFET 20, due to the increase in the ambient temperature of the MOSFET 20. In this case, if the resistance Rs of the resistor circuit 26 decreases to (½) times the resistance Rs before the increase in the ambient temperature of the MOSFET 20, the current threshold Ith does not change.

In order to maintain the current threshold Ith at a constant target current Ig, the following expression needs to be satisfied.

$$Rs \cdot Ra = Rt \cdot Vr / Ig$$

Here, because the resistance Rt of the device resistor 24 is constant regardless of the ambient temperature of the MOSFET 20, $(Rt \cdot Vr/Ig)$ is constant. Accordingly, the resistor circuit 26 may be designed so that the product of the resistance Rs of the resistor circuit 26 and the on-resistance Ra of the MOSFET 20 is maintained at a fixed value, even when the ambient temperature of the MOSFET 20 varies. With this configuration, the current threshold Ith is maintained at the constant target current Ig, regardless of the ambient temperature of the MOSFET 20.

Figure 4:
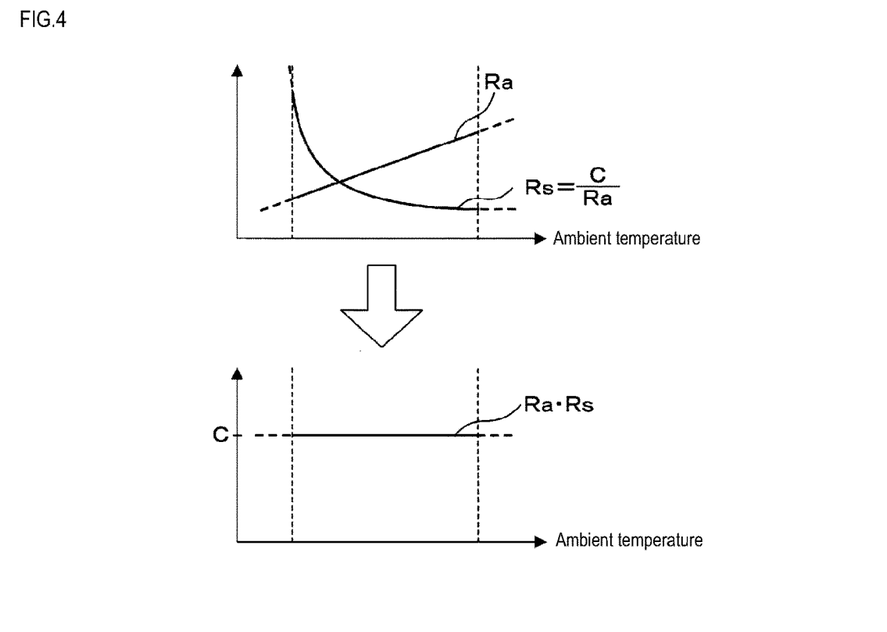
FIG. 4 is a diagram illustrating a resistance in an ideal resistance circuit.

FIG. 4 is a diagram illustrating the resistance Rs in an ideal resistance circuit 26. The upper part of FIG. 4 shows the relationship between the on-resistance Ra of the MOSFET 20 and the ambient temperature of the MOSFET 20, and the ideal relationship between the resistance Rs of the resistor circuit 26 and the ambient temperature of the MOSFET 20. The lower part of FIG. 4 shows the relationship between $(Ra \cdot Rs)$ and the ambient temperature of the MOSFET 20. Here, $(Rt \cdot Vr/Ig)$ is described as C. Note, that C is a constant.

As shown in FIG. 4, a switch whose on-resistance is proportional to the ambient temperature within a preset range of the ambient temperature is used as the MOSFET 20. The on-resistance Ra of the MOSFET 20 increases when the ambient temperature of the MOSFET 20 increases. If the resistance Rs of the resistor circuit 26 is $(C/Ra)$ within the set range of the ambient temperature of the MOSFET 20, $(Ra \cdot Rs)$ is maintained at the constant C regardless of the ambient temperature of the MOSFET 20, as shown in the lower part of FIG. 4.

Accordingly, a circuit whose resistance changes in the same manner as $(C/Ra)$ with respect to the ambient temperature of the MOSFET 20 may be used as the resistor circuit 26.

Configuration of Resistor Circuit 26

Figure 5:
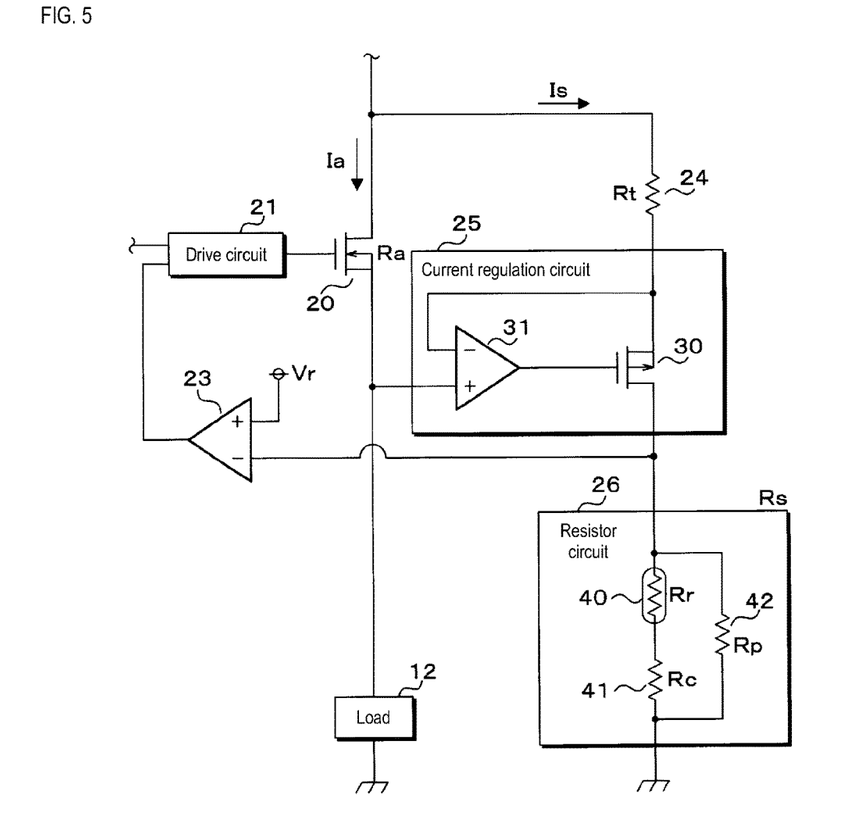
FIG. 5 is a circuit diagram of the resistor circuit.

FIG. 5 is a circuit diagram of the resistor circuit 26. The resistor circuit 26 includes a thermistor 40, a series resistor 41, and a parallel resistor 42. One end of the thermistor 40 is connected to the drain of the regulation FET 30. The other end of the thermistor 40 is connected to one end of the series resistor 41. The other end of the series resistor 41 is grounded. As described above, the series resistor 41 is directly connected to the thermistor 40. The parallel resistor 42 is connected in parallel to a series circuit constituted by the thermistor 40 and the series resistor 41. The one end of the thermistor 40 is one end on the upstream side of the resistor circuit 26. In contrast, the other end of the series resistor 41 is one end on the downstream side of the resistor circuit 26.

The resistance of the thermistor 40 decreases, when the temperature of the thermistor 40 increases. The thermistor 40 is disposed near the MOSFET 20. Accordingly, the temperature of the thermistor 40 is substantially equal to the ambient temperature of the MOSFET 20. As a result, the resistance of the thermistor 40 decreases, when the ambient temperature of the MOSFET 20 increases.

Accordingly, the resistance of the thermistor 40 varies, according to the ambient temperature of the MOSFET 20, in a direction different from a direction in which the on-resistance of the MOSFET 20 varies. For this reason, the resistance of the resistor circuit 26 including the thermistor 40 varies, according to the ambient temperature of the MOSFET 20, in a direction different from the direction in which the on-resistance of the MOSFET 20 varies.

When the change of the resistance of the thermistor 40 with respect to the ambient temperature of the MOSFET 20 does not coincide with the change of (C/Ra) shown in FIG. 4, the change of the resistance Rs of the resistor circuit 26 can be made to substantially coincide with the change of (C/Ra) shown in FIG. 4 by connecting the series resistor 41 and the parallel resistor 42.

The resistances of the resistor circuit 26, the thermistor 40, the series resistor 41, and the parallel resistor 42 are denoted by Rs, Rr, Rc, and Rp, respectively. The resistance Rs of the resistor circuit 26 satisfies the following expression.

$$Rs=(Rr+Rc)\cdot Rp/(Rr+Rc+Rp)$$

Effect of Series Resistor 41

Figure 6:
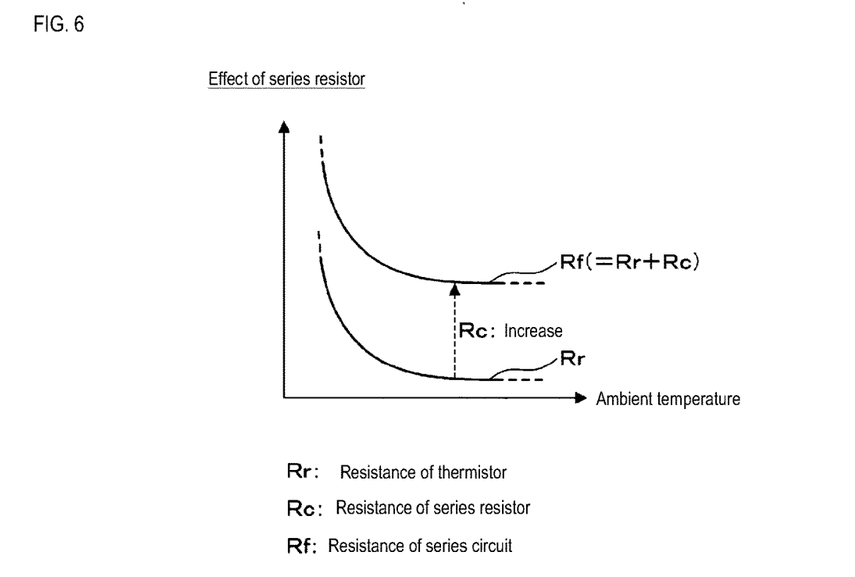
FIG. 6 is a diagram illustrating an effect of a series resistor.

FIG. 6 is a diagram illustrating an effect of the series resistor 41. The resistance of the series circuit constituted by the thermistor 40 and the series resistor 41 is denoted by Rf. The resistance Rf of the series circuit is represented by (Rr+Rc). FIG. 6 shows the relationship between the resistance Rc of the thermistor 40 and the ambient temperature of the MOSFET 20, and the relationship between the resistance Rf of the series circuit and the ambient temperature of the MOSFET 20. As shown in FIG. 6, the resistance Rc of the thermistor 40 decreases, when the ambient temperature of the MOSFET 20 increases. The resistance Rc of the thermistor 40 changes in a curve.

The resistance Rc of the series resistor 41 is constant, regardless of the ambient temperature of the MOSFET 20. Accordingly, by connecting the series resistor 41 in series to the thermistor 40, the resistance can be increased from the resistance Rr of the thermistor 40 by the resistance Rc of the series resistor 41, without changing the shape of the change shown in the graph showing the relationship between the resistance Rc of the thermistor 40 and the ambient temperature of the MOSFET 20. With this configuration, by connecting the series resistor 41 in series to the thermistor 40, the minimum value of the resistance Rs of the resistor circuit 26 can be regulated.

Effect of Parallel Resistor 42

Figure 7:
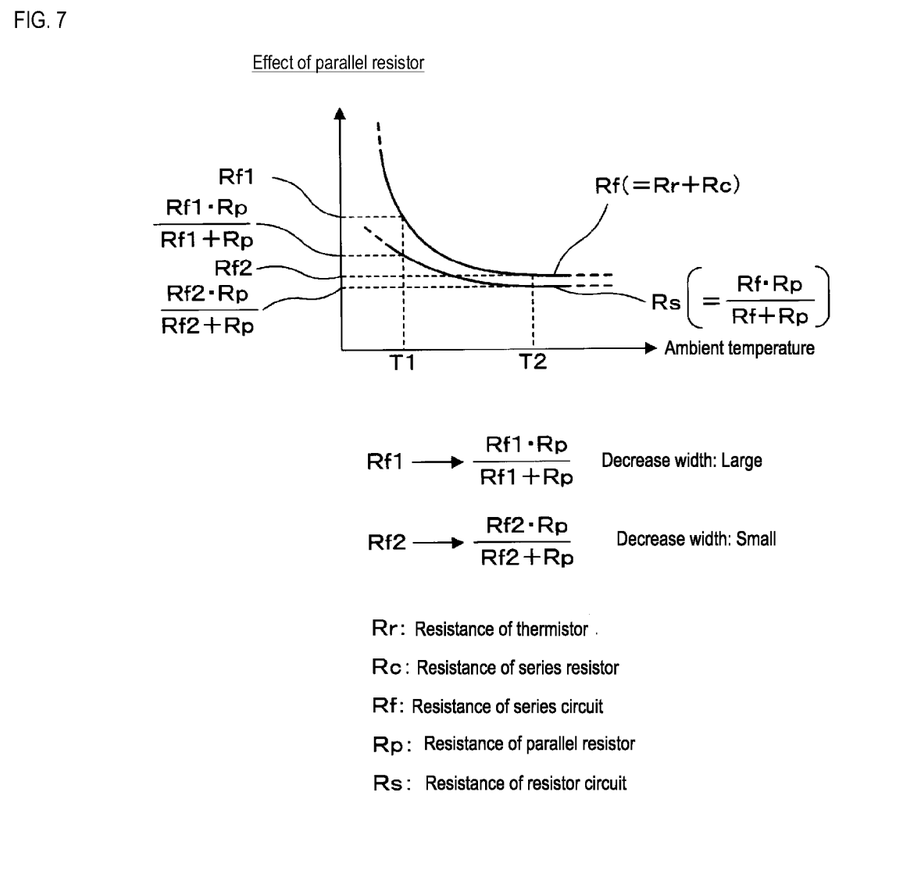
FIG. 7 is a diagram illustrating an effect of a parallel resistor.

FIG. 7 is a diagram illustrating an effect of the parallel resistor 42. FIG. 7 shows the relationship between the resistance Rf of the series circuit constituted by the thermistor 40 and the series resistor 41, and the ambient temperature of the MOSFET 20. FIG. 7 further shows the relationship between the resistance Rs of the resistor circuit 26 and the ambient temperature of the MOSFET 20.

The resistance of the parallel circuit constituted by the series circuit and the parallel resistor 42 is (Rf·Rp/(Rf+Rp)), and is lower than the resistance Rf of the series circuit. Accordingly, by connecting the parallel resistor 42 in parallel to the series circuit, the resistance is reduced from Rf to (Rf·Rp/(Rf+Rp)). The resistances of the thermistor 40 and the series circuit when the ambient temperature of the MOSFET 20 is the first temperature T1 are denoted by Rr1 and Rf1, respectively. Also, the resistances of the thermistor 40 and the series circuit when the ambient temperature of the MOSFET 20 is the second temperature T2 are denoted by Rr2 and Rf2, respectively. The following equations hold for the resistances Rf1 and Rf2 of the series circuit:

$$Rf1=Rr1+Rc$$

$$Rf2=Rr2+Rc$$

The resistance Rr of the thermistor 40 becomes smaller, as the ambient temperature of the MOSFET 20 becomes higher. Because the second temperature T2 is higher than the first temperature T1, the resistance Rr2 is smaller than the resistance Rr1. As described above, the resistance Rc of the series resistor 41 is constant, regardless of the ambient temperature of the MOSFET 20. Accordingly, the resistance Rf2 is smaller than the resistance Rf1.

When the ambient temperature of the MOSFET 20 is the first temperature T1, the resistance Rs of the resistor circuit 26 is expressed by (Rf1·Rp/(Rf1+Rp)). Accordingly, by connecting the parallel resistor 42 in parallel to the series circuit, the resistance is reduced from Rf1 to (Rf1·Rp/(Rf1+Rp)). Similarly, when the ambient temperature of the MOSFET 20 is the second temperature T2, the resistance Rs of the resistor circuit 26 is expressed by (Rf2·Rp/(Rf2+Rp)). Accordingly, by connecting the parallel resistor 42 in parallel to the series circuit, the resistance is reduced from Rf2 to (Rf2·Rp/(Rf2+Rp)).

The width of decrease in the resistance when the ambient temperature of the MOSFET 20 is the second temperature T2 is smaller than the width of decrease in the resistance when the ambient temperature of the MOSFET 20 is the first temperature T1. Here, it is assumed that the resistances Rf1, Rf2, and Rp are respectively 10 ohms, 5 ohms, and 5 ohms, for example. When the ambient temperature of the MOSFET 20 is the second temperature T2, the resistance decreases from 5 ohms to 2.5 ohms, and thus the width of decrease is 2.5 ohms. In contrast, when the ambient temperature of the MOSFET 20 is the first temperature T1, the resistance decreases from 10 ohms to 3.33 ohms (=10/3), and thus the width of decrease is 6.66 ohms (=20/3).

The larger the resistance Rf of the series circuit is, the larger the amount of decrease in the resistance caused by connecting the parallel resistor 42 is. Accordingly, by connecting the parallel resistor 42, the curvature of the change shown in the graph showing the relationship between the resistance Rf of the series circuit and the ambient temperature of the MOSFET 20 can be reduced. When the curvature is reduced, the change shown in the graph approaches a straight line.

When the ambient temperature of the MOSFET 20 is fixed to a certain temperature, the smaller the resistance of the parallel resistor 42 is, the larger the width of the decrease in the resistance is. Accordingly, the smaller the resistance Rp of the parallel resistor 42 is, the larger the width of the decrease in the curvature in the change shown in the graph is. The curvature of the change shown in the graph decreases to a smaller value, as the resistance Rp of the parallel resistor 42 decreases.

From the above, by connecting the parallel resistor 42 in parallel to the series circuit constituted by the thermistor 40 and the series resistor 41, it is possible to change the shape of the change shown in the graph showing the relationship between the resistance Rs of the resistor circuit 26 and the ambient temperature of the MOSFET 20. As a result, the shape of the change shown in the graph showing the relationship between the resistance Rs of the resistor circuit 26 and the ambient temperature of the MOSFET 20 can be made to substantially coincide with the shape of the change shown in the graph drawn by (C/Ra) shown in FIG. 4.

The resistance circuit 26 includes the series resistor 41 and the parallel resistor 42. Accordingly, even when (Ra·Rr) varies according to the ambient temperature, it is possible to reliably achieve a configuration in which (Ra·Rs) is constant regardless of the ambient temperature of the MOSFET 20, by connecting the series resistor 41 and the parallel resistor 42. As describe above, Ra, Rr, and Rs are the on-resistance of the MOSFET 20, the resistance of the thermistor 40, and the resistance of the resistor circuit 26, respectively.

Effect of Power Supply Control Device 10

The circuit voltage Vd of the resistor circuit 26 is expressed by (Rs·Ra·Ia/Rt). As described above, Ia is the switch current flowing through the MOSFET 20. Rt is the resistance of the device resistor 24. The resistance Rs of the resistor circuit 26 varies, according to the ambient temperature of the MOSFET 20, in a direction different from a direction in which the on-resistance Ra of the MOSFET 20 varies. Specifically, when the ambient temperature of the MOSFET 20 increases, the on-resistance Ra of the MOSFET 20 increases, and the resistance Rs of the resistor circuit 26 decreases.

For this reason, even when the ambient temperature of the MOSFET 20 varies, because (Rs·Ra) is substantially constant, the circuit voltage Vd hardly varies according to the ambient temperature of the MOSFET 20. Here, the circuit voltage Vd is proportional to the switch current Ia. Accordingly, when the switch current Ia exceeds the predetermined current threshold Ith (target current Ig), the circuit voltage Vd exceeds the predetermined voltage Vr, and the MOSFET 20 is turned off.

Second Embodiment

In the first embodiment, the parallel resistor 42 may not necessarily be connected between the two ends of the series circuit constituted by the thermistor 40 and the series resistor 41.

In the following, differences between a second embodiment and the first embodiment will be described. Configurations other than those described below are common to those disclosed in the first embodiment. Accordingly, components common to those disclosed in the first embodiment are denoted by the same reference numerals as those disclosed in the first embodiment, and description thereof will be omitted.

Configuration of Resistor Circuit 26

Figure 8:
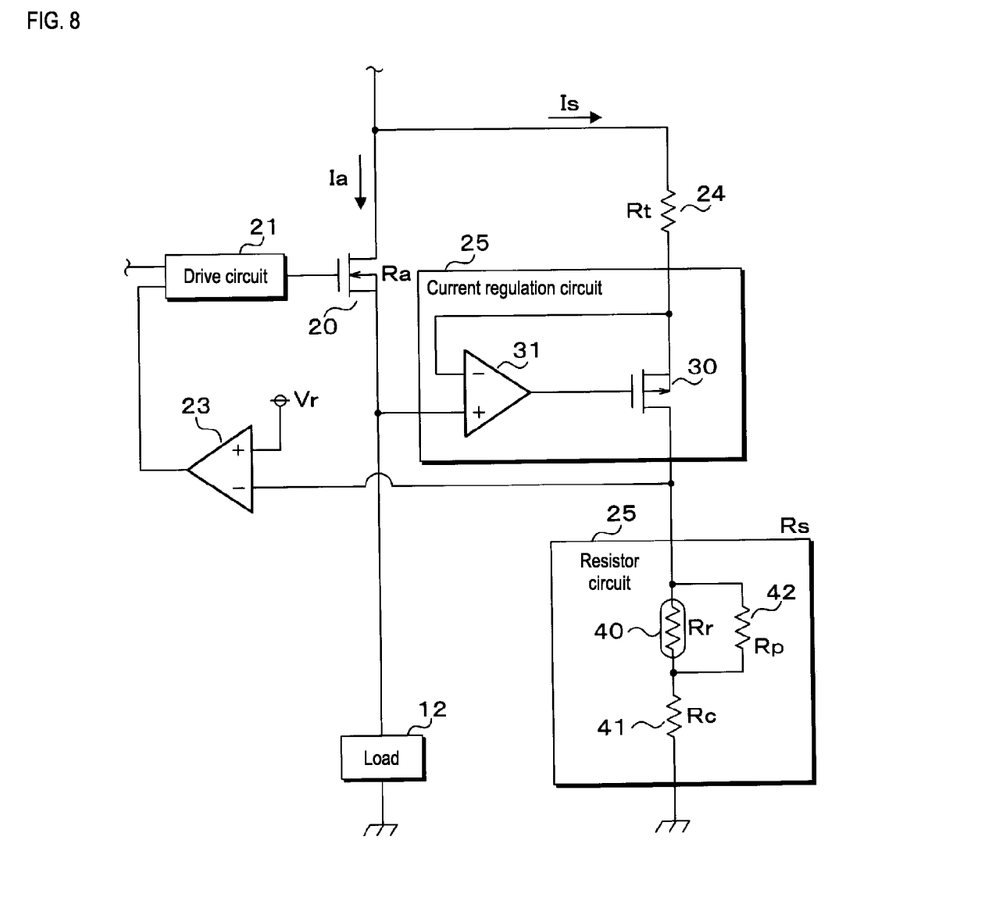
FIG. 8 is a circuit diagram of a resistor circuit according to a second embodiment.

FIG. 8 is a circuit diagram of a resistor circuit 26 according to the second embodiment. In the resistor circuit 26 according to the second embodiment, the parallel resistor 42 is connected in parallel to the thermistor 40, instead of to the series circuit constituted by the thermistor 40 and the series resistor 41.

By connecting the parallel resistor 42 in parallel to the thermistor 40, the curvature of the change shown in the graph showing the relationship between the resistance Rr of the thermistor 40 and the ambient temperature of the MOSFET 20 is reduced, and the shape of the change is changed. By connecting the series resistor 41 in series to the parallel circuit constituted by the thermistor 40 and the parallel resistor 42, the resistance can be increased from the resistance of the parallel circuit by the resistance Rc of the series circuit 41, without changing the shape of the change shown in the graph showing the relationship between the resistance of the parallel circuit and the ambient temperature of the MOSFET 20.

Accordingly, by connecting the parallel resistor 42 in parallel to the thermistor 40, the shape of the change shown in the graph showing the relationship between the resistance Rs of the resistor circuit 26 and the ambient temperature of the MOSFET 20 can be made to substantially coincide with the shape of the change shown in the graph drawn by (C/Ra) shown in FIG. 4, as in the first embodiment. Furthermore, by connecting the series resistor 41 in series to the parallel circuit, the minimum value of the resistance Rs of the resistor circuit 26 can be regulated, as in the first embodiment. As a result, even when (Ra·Rr) varies according to the ambient temperature, it is possible to reliably achieve a configuration in which (Ra·Rs) is constant regardless of the ambient temperature of the MOSFET 20, by connecting the series resistor 41 and the parallel resistor 42. As described in the first embodiment, Ra, Rr, and Rs are the on-resistance of the MOSFET 20, the resistance of the thermistor 40, and the resistance of the resistor circuit 26, respectively.

Effect of Power Supply Control Device 10

The power supply control device 10 according to the second embodiment achieves the same effect as the power supply control device 10 according to the first embodiment.

Modified Examples

In the first embodiment, when a configuration in which (Ra·Rs) is constant regardless of the ambient temperature of the MOSFET 20 can be achieved by connecting the series resistor 41 in series to the thermistor 40, the resistor circuit 26 may not include the parallel resistor 42. Also, in the second embodiment, when a configuration in which (Ra·Rs) is constant regardless of the ambient temperature of the MOSFET 20 can be achieved by connecting the parallel resistor 42 in parallel to the thermistor 40, the resistor circuit 26 may not include the series resistor 41. In this case, the other end of the thermistor 40 is one end on the downstream side in the current path through which the resistor current flows, and is grounded.

In the first and second embodiments, when (Ra·Rr) is constant regardless of the ambient temperature of the MOSFET 20, the resistor circuit 26 may not include the series resistor 41 and the parallel resistor 42. As described in the description of the first embodiment, Rr is the resistance of the thermistor 40. When the resistor circuit 26 does not include the series resistor 41 and the parallel resistor 42, the other end of the thermistor 40 is one end on the downstream side in the current path through which the resistor current flows, and is grounded.

In the first and second embodiments, the switch that is connected between the DC power source 11 and the load 12 may be a semiconductor switch, and may not be an N-channel MOSFET 20. The switch that is connected between the DC power source 11 and the load 12 may be an N-channel FET, a P-channel FET that are different from the MOSFET, an insulated gate bipolar transistor (IGBT), or the like.

In the first and second embodiments, the variable resistor included in the current regulation circuit 25 may not be the regulation FET 30, that is to say, a P-channel FET. The variable resistor may also be, for example, a PNP bipolar transistor. In this case, the emitter, the collector, and the base of the bipolar transistor correspond to the source, the drain, and the gate of the regulation FET 30, respectively.

It should be understood that the disclosed first and second embodiments are illustrative in all respects, and are not restrictive. The scope of the present invention is defined not by the above description, but by the claims, and is intended to include meanings equivalent to the claims and all modifications within the scope.

The invention claimed is:

1. A power supply control device for controlling power supply by turning on or off a semiconductor switch through which a current flows, comprising:
   a resistor having one end connected to one end on an upstream side of the semiconductor switch;
   a current regulation circuit configured to regulate a current flowing through the resistor to a current proportional to a voltage across the semiconductor switch;
   a resistor circuit disposed in a current path through which the current flowing through the resistor flows; and
   a switching circuit configured to turn off the semiconductor switch when the voltage across the resistor circuit exceeds a predetermined voltage,
   wherein the on-resistance of the semiconductor switch varies according to an ambient temperature of the semiconductor switch, and
   the resistance of the resistor circuit varies, according to the ambient temperature, in a direction different from a direction in which the on-resistance varies.

2. The power supply control device according to claim 1, wherein the resistor circuit includes:
   a thermistor whose resistance varies, according to the ambient temperature, in a direction different from a direction in which the on-resistance varies; and
   a series resistor connected in series to the thermistor.

3. The power supply control device according to claim 2, wherein the resistor circuit includes a parallel resistor connected in parallel to a series circuit constituted by the thermistor and the series resistor.

4. The power supply control device according to claim 1, the current regulation circuit includes:
   a variable resistor disposed on a downstream side of the resistor in the current path; and
   a resistance regulation unit configured to regulate the resistance of the variable resistor so that a voltage at one end on a downstream side of the semiconductor switch is equal to a voltage at one end on the downstream side of the resistor.

* * * * *